(12) United States Patent
Bailey et al.

(10) Patent No.: US 7,761,851 B2
(45) Date of Patent: Jul. 20, 2010

(54) COMPUTER METHOD AND SYSTEM FOR INTEGRATING SOFTWARE DEVELOPMENT AND DEPLOYMENT

(75) Inventors: Don T. Bailey, Arlington, TX (US); Stephen L. Hunt, Indianapolis, IN (US); Kartik T. Kanakasabesan, Markham (CA); Stephen D. Seifert, Marshall, MI (US); Malcolm D. Thomas, Franklin, TN (US)

(73) Assignee: International Business Machines Corporation, Armonk, NY (US)

( * ) Notice: Subject to any disclaimer, the term of this patent is extended or adjusted under 35 U.S.C. 154(b) by 1238 days.

(21) Appl. No.: 11/320,231

(22) Filed: Dec. 28, 2005

(65) Prior Publication Data
US 2007/0006122 A1 Jan. 4, 2007

Related U.S. Application Data

(60) Provisional application No. 60/685,946, filed on May 31, 2005.

(51) Int. Cl.
*G06F 9/44* (2006.01)
*G06F 17/00* (2006.01)
(52) U.S. Cl. .................................. 717/121; 726/1
(58) Field of Classification Search .............. 717/121; 726/1
See application file for complete search history.

(56) References Cited

U.S. PATENT DOCUMENTS 6,421,671 B1 * 7/2002 Bryan et al. ............... 707/10
2007/0180490 A1 * 8/2007 Renzi et al. ................ 726/1

* cited by examiner

*Primary Examiner*—Wei Y Zhen
*Assistant Examiner*—Chih-Ching Chow
(74) *Attorney, Agent, or Firm*—Hamilton, Brook, Smith & Reynolds, PC

(57) ABSTRACT

A computer implemented method and system for software auditability and bidirectional traceability in a software development lifecycle is provided. The lifecycle having at least development and deployment phases is bridged with a configurable workflow engine, a configuration management engine, and a managed deployment engine, interconnected with one or more representations of work to be performed or of work performed. Additionally, auditability and bidirectional traceability is provided by linking a development asset in the development phase to a deployment asset in the deployment phase so that: the development asset can be determined from the deployment asset; a deploying entity deploying the deployment asset can be determined from the development asset; a development request for developing the development asset can be determined from the deployment asset deployed; and a deployment environment where the deployment asset is being deployed can be determined from the development asset.

19 Claims, 11 Drawing Sheets

COMPUTER METHOD AND SYSTEM FOR INTEGRATING SOFTWARE DEVELOPMENT AND DEPLOYMENT

RELATED APPLICATIONS

This application claims the benefit of U.S. Provisional Application No. 60/685,946, filed on May 31, 2005. The entire teachings of the above application are incorporated herein by reference.

BACKGROUND OF THE INVENTION

The development and deployment of software applications is becoming progressively more complex, fast-paced and critical to business success. Companies now need to build, test and deploy new versions of applications with increasing frequency while maintaining 24×7 operations.

Today's IT departments have more systems to manage, more locations to support and more mission-critical applications to build, deploy and maintain than ever before. Organizations now find that they must rebuild and redeploy dozens or even hundreds of new software versions a week across multiplatform global networks. Yet the need to eliminate business downtime associated with software rollouts is evermore paramount. Accordingly, these growing concerns place the application build/deploy process squarely in the critical path to competitive success.

The application build/deploy process is a multi-step process. The first step in the process is to build and test the application. Next, the application must be packaged so that it can be easily distributed to the operational servers, which often occurs through a corporate firewall. The servers then need to be updated and the application put into production. If an error is detected, the application running on the operational server must be rolled back to a previous working version. The defect information needs to go back to the development team, who must be able to view the correct application and file versions. After they repair and rebuild it, the application is repackaged and transported to the operational servers; and the servers are updated to run the new version of the application.

To facilitate the application build/deploy process, many organizations employ processes to move applications from the build phase to the deploy phase. These processes are typically either partly or entirely manual. As consequent, these processes are time-consuming and error-prone. Inevitably, these inefficient processes lead to loss of revenue because of business downtime and reduced software quality. Additionally, manual processes (whether partly or entirely) make compliance with regulations and other mandates challenging—primarily because it can be difficult to identify which application versions are in operation on which servers and to identify which software configurations were used to build a given deployed application.

In a manual application build/deploy process, an application destined for various targets must be manually copied from a build environment to a deployment area, and then manually distributed. Server provisioning and configurations must also be checked manually, generally by logging on to each server. A spreadsheet is typically employed to manually track which release went to which server.

In addition to requiring extensive manual intervention, several problems can arise during a manual application build/deploy process, including:

(1) difficulty in reproducing and fixing defects, which can delay application delivery and decrease quality;

(2) difficulty in rolling an application back to a previous version, which can waste time and development resources;

(3) redeployment failures, which can waste time and resources and negatively affect customer satisfaction; and (4) undocumented deployment procedures, which can decrease individual productivity and increase redundant tasks.

Additionally, a manual build/deployed process may compromise security. To enable the manual transfer of executables through firewalls, server ports may be opened for long periods of time. With holes in its security, an enterprise is vulnerable and remains vulnerable until the manual transfer of executables is completed and the server ports are closed.

Even in an automated solution for managing application deployments, many of same problems remain, particularly those pertaining to defect repair and rollback.

As a consequence of the aforementioned deficiencies, there exists an area of weakness that can prevent, delay or compromise application deployments and require several intensive hours to diagnose and resolve.

SUMMARY OF THE INVENTION

The key to optimizing the software build/deploy life cycle is a reliable, automated process that enables problems to be reproduced, diagnosed and repaired against the precise version of the application that failed on whatever platform was involved.

This makes possible other automated capabilities that are critical to success, such as:

(1) the ability to roll back smoothly to a previous application version when issues occur, without the need for manual intervention;

(2) an audit trail to specify what executables were deployed and where; and (3) the ability to maximize time and resources by building and deploying only what is necessary to "patch" a defect or implement an enhancement, as opposed to rebuilding and redeploying an entire application.

(4) tracing executables in production back to the software assets from which they were built;

Bringing together a configurable workflow engine, a configuration management engine, and a managed deployment engine into an integrated development/deployment solution may help, for example, automate and manage software builds and deployments.

With the integrated development/deployment solution, organizations may now, for example, readily define a repeatable, well-supported process which traces executables in production back to the software assets from which they were built-thus streamlining the application build/deploy cycle to significantly reduce cost and risk. The integrated development/deployment solution may also provide, for example, key capabilities for software update management such as secure, enterprise-scale distribution control; rollback; audit trail functions; role-based access controls; and enhanced software componentization and reuse.

The configuration management and the configurable workflow engines provide, for example, version control, flexible workspace management, access control and advanced build management. The configuration management and the configurable workflow engines also provide, for example, comprehensive build auditing for improved release maintenance.

Additionally, the configuration management and the configurable workflow engines may provide, for example, sophisticated build features such as:

(1) creation of configuration records—a software bill-of-materials that documents a software build and enables the build to be reproduced on demand;

(2) configuration lookup—a build avoidance scheme that enables only the changed files to be rebuilt, as opposed to rebuilding the entire application;

(3) dependency detection—a feature that guarantees correct build behavior even for files not explicitly listed as dependencies in the build instructions; and (4) ability for team members to share existing built objects—this feature enables team members to save time that they would otherwise spend performing unnecessary rebuilds.

The configuration management and the configurable workflow engines result in faster promotion of products through the test and verification phases and facilitate correct, reproducible builds from the right sources. Consequently, the end result may be, for example, higher-quality releases delivered in accelerated time frames.

The managed deployment engine provides a comprehensive, multiplatform control over enterprise-wide software distribution and inventory management processes, including rollback, traceability, dependency checking, reporting and access control. The managed deployment ending allows a user to schedule, submit, monitor and control distribution activities to simplify and streamline software distribution. The managed deployment engine also securely performs software distribution and inventory operations against systems operating outside corporate firewalls.

The configurable workflow engine, the configuration management engine, and the managed deployment engine enable an organization to rapidly and effectively build and deploy diverse applications across even the most complex global environments.

The configurable workflow engine and the configuration management engine may be used, for example, to manage the software change and build processes. For example, an application is first developed or updated with required enhancements and defect repairs. Next, the build is completed. A configuration record which represents all the required features and defect repairs may be, for example, tested and staged; promotion levels and approvals may be obtained for example; and a label may be assigned for example.

Next, the configuration record of the configurable workflow and configuration management engines may be used to create, for example, a distribution. The distribution may include, for example, profiles which contain instructions for software distribution. The distribution may be named, for example, after the configuration record of the configurable workflow engine and configuration management engine. This allows users to trace the distribution to identified configuration records and deployment asset of the configurable workflow and configuration management engineers, thus providing an audit trail between the deployed application and development assets. The distribution may be created and copied, for example, into the managed deployment engine. The managed deployment engine may then, for example, initiate a distribution process and deliver the distribution to a target destinations.

Bringing together the configurable workflow engine, the configuration management engine, and the managed deployment engine into the integrated development/deployment solution provides, for example, a single solution which automates and controls the software update cycle. The integrated development/deployment solution enables users to create the distribution from the development assets comprising of the configuration record, which is created and managed by the configurable workflow and configuration management engines. The integrated development/deployment solution also enables users to deploy the distribution to multiple target servers using the managed deployment engine. By connecting and automating development and deployment, the integrated development/deployment solution thus enables faster application delivery and an improved ability to meet time-critical business demands.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Integrated Development/Deployment Solution

Figure 1:
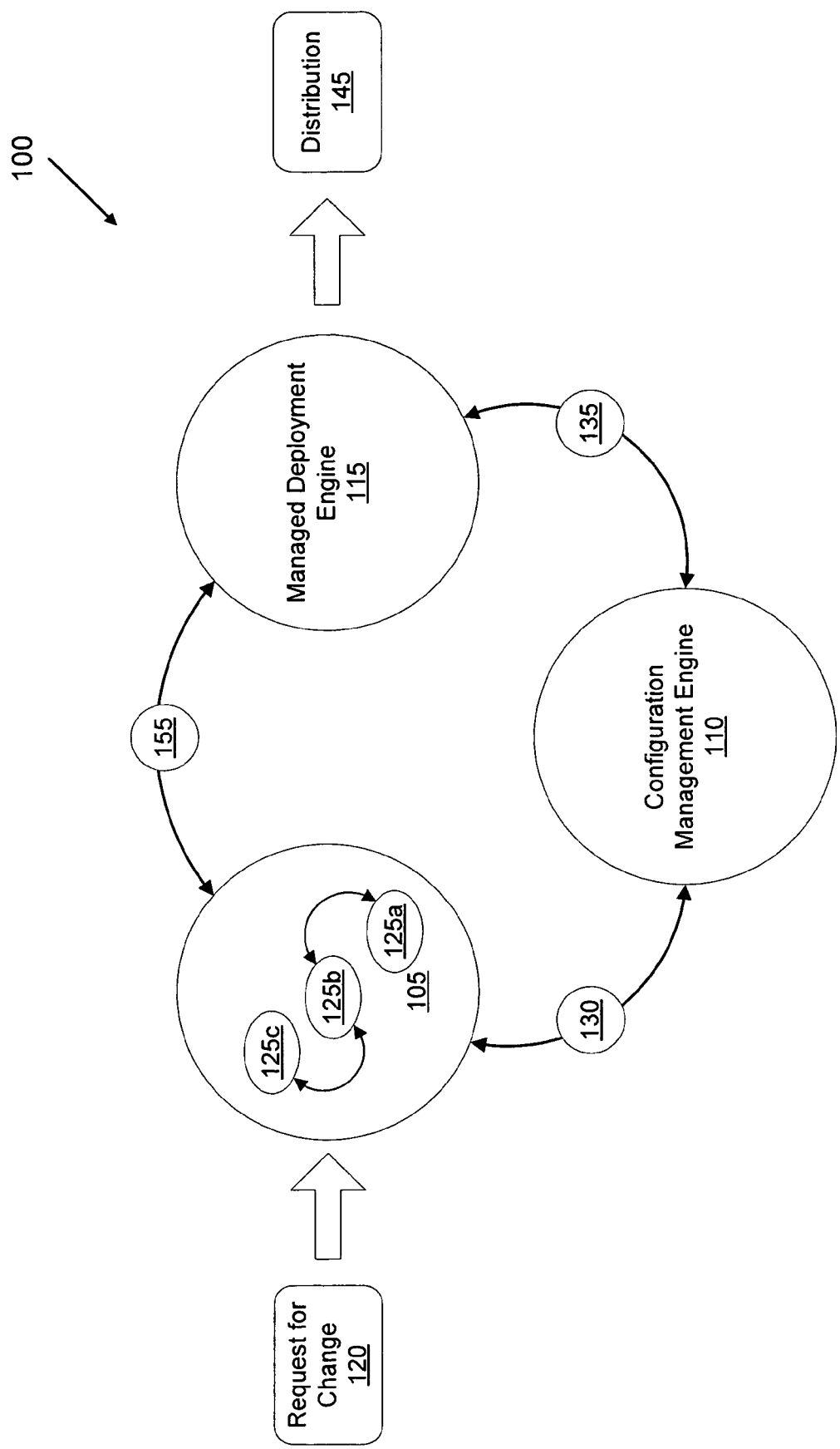
FIG. 1 is a block diagram illustrating an exemplary integrated development/deployment solution in accordance with one embodiment of the present invention.

FIG. 1 illustrates an exemplary integrated development/deployment solution 100 of the present invention which provides development to deployment auditability and bidirectional traceability. The integrated development/deployment solution 100 in one embodiment includes a configurable workflow engine 105, a configuration management engine 110 and a managed deployment engine 115.

The configurable workflow engine 105 is initiated, for example, by a request for change 120. The request for change 120 may be, for example, a defect or an enhancement. The request for change 120 may represent, for example, a unit of work to be performed. Alternatively, the request for change 120 may be divided into smaller units of work to be performed (not shown) or the request for change 120 may be aggregated into a larger unit of work to be performed (not shown).

The configurable workflow engine 105 manages the request for change 120 by using one or more change processes 125a-c (generally 125, described in greater detail below).

Change Process

Each change process 125 provides a framework for defining a workflow. For example, how the request for change 120 is assigned, worked on, tested and delivered may be defined by each change process 125. Each change process 125 also provides a framework for defining a managed deployment. For example, how the request for change 120 is deployed may be defined by each change process 125. In addition, each change process 125 provides a framework for defining an authorization. For example, who may authorize the request for change 120 may be defined by each change process 125. By using more than one change process 125, each defining its own workflow, managed deployment and authorization, it is possible to govern through configuration rules and roles (to be described in greater detail later) or other techniques, how the request for change 120 is managed.

Configuration Management Engine

The configuration management engine 110 manages what development assets and which versions of those development assets represent a configuration. For example, the configuration management engine 105 responds to the request for change 120 by providing a list of versioned development assets 130 created to work on the request for change 120. The list of versioned development assets 130 may be, for example, a list of components, files, directories or a combination of the aforementioned. Associated with each development asset is a version. Consequently, to work on the request for change 120, both the development asset(s) and the version(s) of the development asset(s) need to be specified.

For example, a file may have ten versions. A defect is found in the tenth version of the file. To fix the defect, the list of versioned development assets 130 lists the tenth version of the file, but does not list the first nine versions. Accordingly, the list of versioned development assets 130 represents a configuration relating to the request for change 120.

Continuing with the above example, in addition to the tenth version of the file, additional files may be required, i.e., there are dependencies. Each of the additional files may have more than one version. Accordingly, the list of versioned development assets 130 lists not only the tenth version of the file, but also lists a version of each of the additional dependant files required.

In another example, the configurable workflow engine 105 divides the request for change 120 into smaller units of work, e.g., a first unit of work (not shown) and a second unit of work (not shown). The configuration management engine 110 responds by providing a first list of versioned development assets created to work on the first unit of work and a second list of versioned development assets created to work on the second unit of work. Consequently, the first list of versioned development assets represents a configuration relating to the first unit of work, while the second list of versioned development assets represents a configuration relating to the second unit of work. Collectively, the first and second list of versioned development assets represents a configuration relating to the request for change 120 as a whole.

In yet another example, the configurable workflow engine 105 may aggregate two or more request for changes 120 (e.g., a first request for change and a second request for change) into a larger unit of work. In this case, the configuration management engine 110 responds by providing a first list of versioned development assets created to work on the first request for change and a second list of versioned development assets created to work on the second request for change. Consequently, the first list of versioned development assets represents a configuration relating to the first request for change, while the second list of versioned development assets represents a configuration relating to the second request for change. Collectively, the first and second lists of versioned development assets represents a configuration relating to the larger unit of work, i.e., the aggregation of the first and second requests for changes.

In the configuration management engine 110, the list of versioned development assets 130 may describe, for example, a configuration relating to a unit of work to be performed. That is, the unit of work is performed within the context of the configuration described by the list of versioned development assets 130. Accordingly, another unit of work is performed within the context of a configuration described by another list of versioned development assets. For example, a first unit of work to be performed is performed within the context of a first configuration described by a first list of versioned development assets, while a second unit of work to be performed is performed within the context of a second configuration described by a second list of versioned development assets. Consequently, the first unit of work to be performed is carried out independently from the second unit of work to be performed.

Additionally, the configuration described in the list of versioned development assets 130 and the configuration described in another list of versioned development assets, may be described, for example, in a configuration record 135. Where the list of version development assets 130 may describe the configuration relating to a unit of work to be performed, the configuration record 135 may describe a configuration relating to one or more units of work to be performed. Continuing with the example above, the configuration record 135 describes both the first and second configuration, i.e., the context in which the first and second units of work to be performed are performed.

The configuration record 135 also includes information enabling a managed deployment. For example, the configuration record 135 may include a target environment attribute which identifies one or more target hosts to deploy a distribution 145 (described in greater detailed below). In another example, the configuration record 135 may include a build administrator list which identifies who may build the distribution 145. In yet another example, the configuration record 135 may include a release administrator list which identifies who may deploy the distribution 145. In still another example, the configuration record 135 may include a workflow entity type which specifies a workflow of the distribution 145.

Managed Deployment Engine

The managed deployment engine 115 provides a managed deployment of the distribution 145. The distribution 145 is a resultant of the request for change 120. For example, the distribution 145 may be a binary application, a release note, a web page, a source code, or other objects known in the art.

Recall in the configurable workflow engine 105, the request for change 120 may represent a unit of work to be performed, a plurality of smaller units of work to be performed, or a larger unit of work to be performed. Accordingly, in the managed deployment engine 115, the distribution 145 may be the resultant of a unit of work performed, a plurality of smaller units of work performed, or a larger unit of work performed.

Also recall in the configuration management engine 110, the configuration record 135 may describe the configuration relating to one or more units of work to be performed. Accordingly, in the managed deployment engine 115, the configuration record 135 may describe a configuration relating to the resultant of either the unit of work performed, the plurality of smaller units of work performed or the larger unit of work performed. That is, the configuration record 135 describes the configuration relating to the distribution 145.

Furthermore, as described above, the configuration record 135 includes information enabling the managed deployment of the distribution 145. For example, the configuration record 135 may include the target environment attribute identifying one or more target hosts to deploy the distribution 145. In another example, the configuration record 135 may include the build administrator list identifying who may build the distribution 145. In yet another example, the configuration record 135 may include the release administrator list identifying who may deploy the distribution 145. In still another example, the configuration record 135 may include a workflow entity identifier identifying the workflow of the distribution 145.

In addition to the aforementioned information, the configuration record 135 may also include a location for a distribution definition file. The distribution definition file provides a logic for packaging the configuration relating to one or more units of work performed described by the configuration record 135. For example, if the configuration record 135 describes the configuration relating to one or more units of work performed as having a first, a second and a third list of versioned development assets, then the first, the second, and the third list of versioned development assets are packaged into the distribution 145 in accordance with the distribution definition file.

The distribution definition file also provides one or more actions or specifications for manifesting the configuration relating to one or more units of work performed on the target hosts. Continuing with the previous example, having been packaged the first, the second, and the third list of versioned development assets are manifested on the target hosts according to one or more actions or specifications provided in the distribution definition file.

The managed deployment engine 115 may also, upon deploying the distribution 145 to one or more target hosts, provide a deployment log 155. The deployment log 155 includes indications of the result of deploying the distribution 145. Who deployed the distribution 145 and to which target host the distribution 145 was deployed to is included in the deployment log 155. The configuration record 135 describing the configuration relating to one or more units of work performed which was packaged into the distribution 145 and manifested on the one or more target hosts may also be included in the deployment log 155. In the case where the configuration record 135 is included in the deployment log 155, the unit of work to be performed (or the plurality of smaller units of work to be performed, or the larger unit of work to be performed) corresponding to what was distributed is known. That is, the request for change 120 may also be captured in the deployment log 155. Consequently, by knowing what was deployed the request for change 120, which initiated the unit of work to be performed, is also known.

For example, a first request for change to add an enhancement is deployed to a first target host while a second request for change to fix a defect is deployed to a second target host. Using the deployment log and noting what was deployed to the first and second target hosts, it is known that the first target host received the enhancement while the second target host received the fix.

Configurable Workflow Engine

Figure 3:
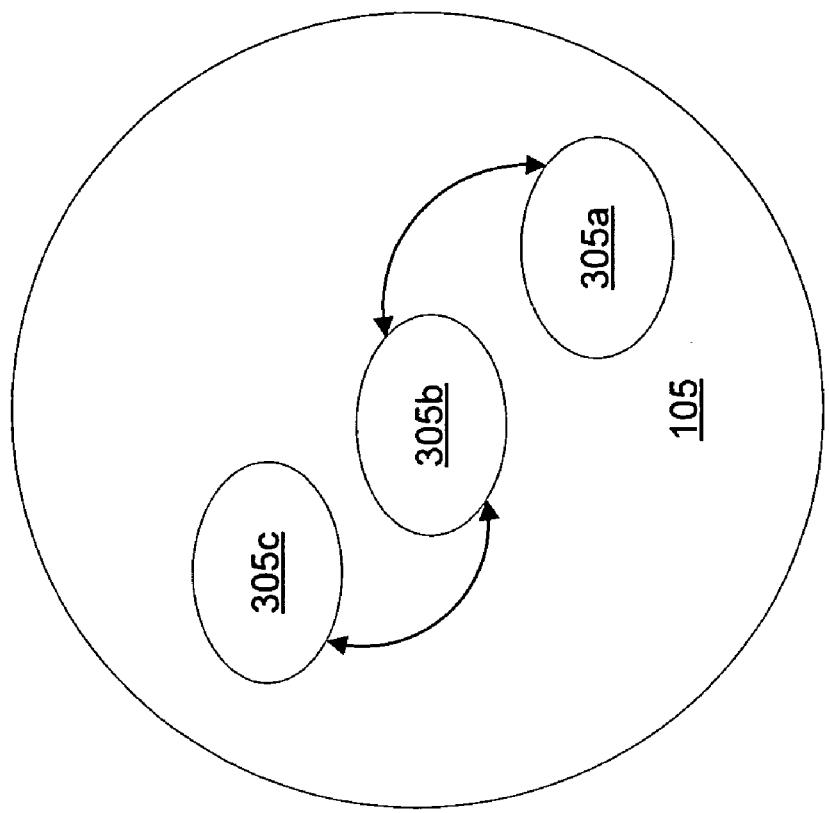
FIG. 3 is a block diagram illustrating an exemplary configurable workflow engine in accordance with one embodiment of the present invention.
Figure 3:
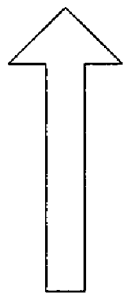
Figure 3:
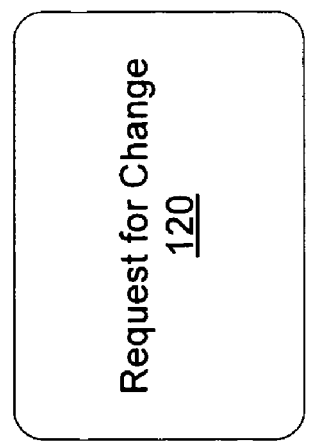

Referring to FIG. 3, a configurable workflow engine 105 manages one or more workflows. For example, the configurable workflow engine 105 includes an activity workflow 305a, a change request workflow 305b, and a release package workflow 305c. Each workflow may be associated with a workflow entity. For example, associated with the activity workflow 305a is an activity workflow entity (not shown), associated with the change request workflow 305b is an change request workflow entity (not shown), and associated with the release package workflow 305c is a release package workflow entity (not shown).

The workflow entity initiates the workflow and is subsequently processed by the workflow. For example, the activity workflow 305a is initiated by the activity workflow entity. Once initiated, the activity workflow 305a processes the activity workflow entity.

Additionally, the workflow entity may represent, for example, a request for change 120. The request for change 120 may be an unit of work to be performed, a plurality of units of work to be performed, or a larger unit of work to be performed. Consequently, the workflow entity may represent the unit of work to be performed, the plurality of smaller units of work to be performed or the larger unit of work to be performed. For example, the activity workflow entity represents the unit of work to be performed. In another example, the change request workflow entity represents the plurality of smaller units of work to be performed. In yet another example, the release package workflow entity represents the larger unit of work to be performed.

Workflow

As previously mentioned, the configurable workflow engine 105 includes one or more workflows. Each workflow details the transitioning of the workflow entity associated with that workflow. For example, the activity workflow 305a details the transitioning of the activity workflow entity. The transitioning of the activity workflow entity may be, for example, for a specific work assigned to a developer. In another example, the change request workflow 305b details the transitioning of the change request workflow entity. The transitioning of the change request entity may be, for example, for one or more changes to an existing project. In yet another example, the release package workflow 305c details the transitioning of the release package workflow entity. The transitioning of the release package workflow entity may be, for example, for testing and deployment.

The transitioning of the workflow entity through the workflow is defined by one or more workflow states and workflow actions. Each workflow state represents a condition of the workflow entity. For example, the transitioning of the activity workflow entity through the activity workflow 305a may be defined in part by an assigned workflow state. The assigned workflow state may represent, for example, the condition where the activity workflow entity is determined to be "in scope" and is slated for resolution.

An act of changing the workflow state (i.e., the condition of the workflow entity) from one workflow state to another workflow state is represented by a workflow action. Continuing with the previous example, an act of changing the activity workflow state from being in the assigned workflow state to a working workflow state (i.e., a condition where the activity workflow entity is being work on) is represented by an open workflow action (not shown).

In addition to representing the act of changing the workflow state from one workflow state to another workflow state, the workflow action also indicates a status of the workflow entity. Continuing with the previous example, in changing the activity workflow entity from the working workflow state to a completed workflow state, a complete workflow action indicates that work relating to the activity workflow entity is completed and is awaiting approval for incorporation into an initiative.

The workflow action may also represent a point of control dictating a requirement. For example, the point of control may require that a work performed be approved for delivery to a shared team integration stream. In another example, the point of control may require that a build object be under version control and built under a controlled build environment. In yet another example, the point of control may require a configuration record be registered as "QA Ready" or "ProductionReady" before deployment to Quality Assurance and/or Production environments. It should be readily apparent to those skilled in the art, the present invention is not intended to be limited by the aforementioned examples of the point of control. One skilled in the art will recognize the point of control may dictate any requirement known in the art.

Exemplary Workflow—Activity Workflow

Figure 4:
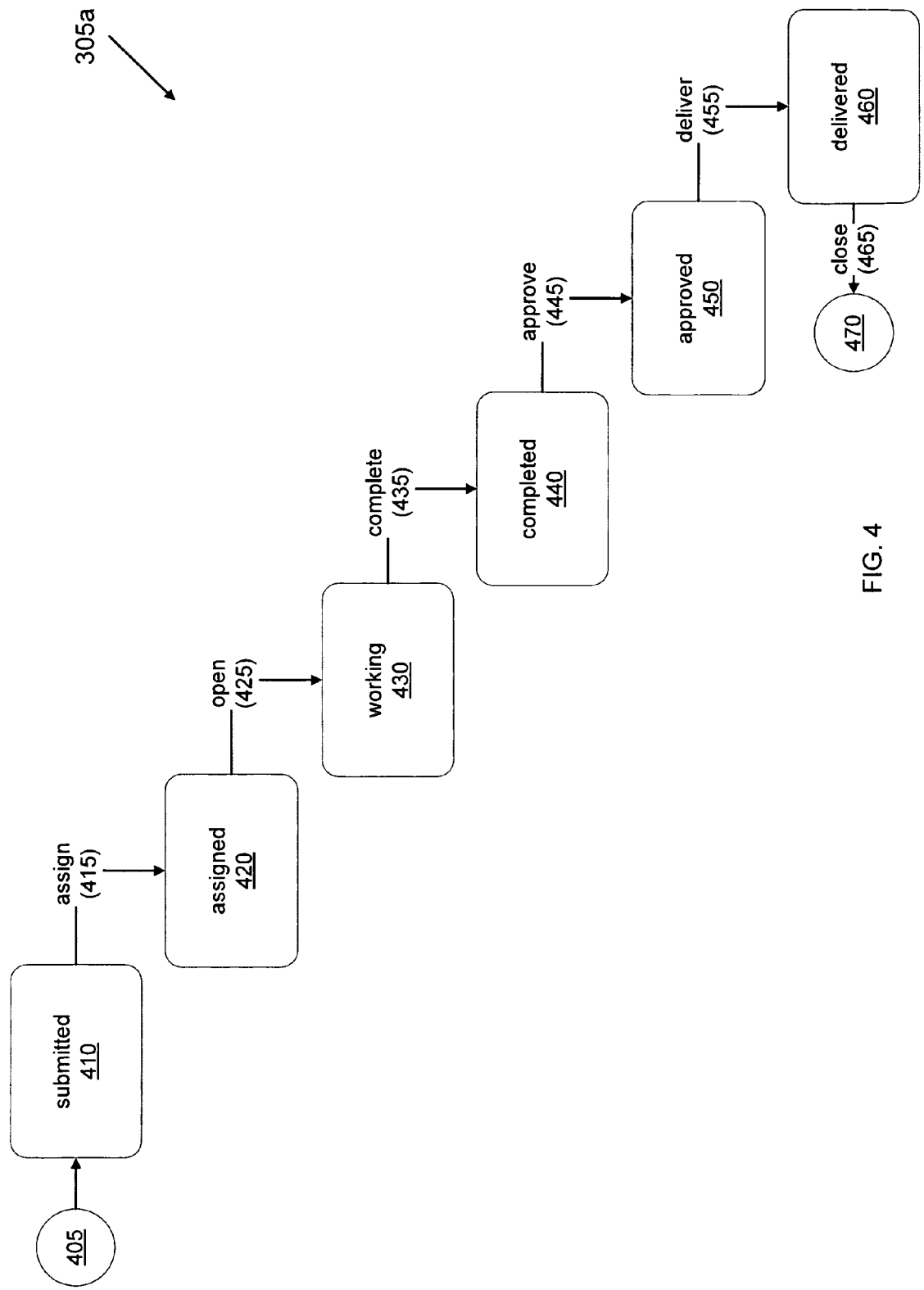
FIG. 4 is a flow diagram illustrating an exemplary activity workflow in accordance with one embodiment of the present invention.

Referring to FIG. 4, an exemplary activity workflow 305a details a transitioning of an activity workflow entity. The transitioning of the activity workflow entity through the exemplary activity workflow 305a may be described by the following exemplary workflow states and workflow actions.

The activity workflow 305a is started by an activity workflow action of submit 405. The activity workflow action of submit 405 may require a form to be filled in with appropriate details regarding the activity workflow entity. Additionally, a state of the activity workflow 305a is changed by the activity workflow action of submit 405.

For example, the state of the activity workflow 305a may be changed by the activity workflow action of submit 405 to an activity workflow state of submitted 410. At the activity workflow state of submitted 410, the activity workflow is in a condition of being placed in a lead developer's queue. Furthermore, at the activity workflow state of submitted 410, the activity workflow entity is in a condition of being unassigned.

The activity workflow state of submitted 410 may be change, for example, by an activity workflow action of assign 415. In turn, the activity workflow state of submitted 410 is changed to an activity workflow state of assigned 420. The activity workflow action of assign 415 may indicate, for example, that the activity workflow entity is being assigned to a developer as work relating to the activity workflow entity. At the activity workflow state of assigned 420, the activity workflow entity may be, for example, in a condition of being determined "in scope" and slated for resolution before an upcoming target milestone. Furthermore, at the activity workflow state of assigned 420, the activity workflow entity is assigned to the developer as work relating to the activity workflow entity.

The activity workflow state of assigned 420 may be changed, for example, by an activity workflow action of open 425. In response, the activity workflow state of assigned 420 is then changed to an activity workflow state of working 430. The activity workflow action of open 425 may indicate, for example, a checkout of versioned development asset(s) relating to the activity workflow entity. At the activity workflow state of working 430, the activity workflow entity is in a condition of being actively worked on by the developer. Additionally, during the activity workflow state of working 430, a list of versioned development assets created for working on the activity workflow entity is maintained in an activity workflow entity record.

The activity workflow state of working 430 may be changed, for example, by an activity workflow action of complete 435. The activity workflow state of working 430 is consequently changed to an activity workflow state of completed 440. The activity workflow action of complete 435 indicates to the lead developer that a work relating to the activity workflow entity is being completed by the developer. Additionally, the activity workflow action of complete 435 indicates the work relating to the activity workflow entity is awaiting approval for integration into an initiative.

At the activity workflow state of completed 440, the activity workflow entity is in a condition of being completed. That is, the developer has completed the work relating to the activity workflow entity. Additionally, at the activity workflow state of completed 440, the activity workflow entity is in a condition of being unit tested. Furthermore, the activity workflow entity is in a condition of waiting for approval by the lead developer.

The activity workflow state of completed 440 may be changed, for example, by an activity workflow action of approve 445. In response, the activity workflow state of completed 440 is changed to an activity workflow state of approved 450. The activity workflow action of approve 445 may indicate, for example, the activity workflow entity is approved for incorporation into the initiative. At the activity workflow state of approved 450, the activity workflow entity is in a condition of being approved for integration into the initiative by the lead developer.

The activity workflow state of approved 450 may be changed, for example, by an activity workflow action of deliver 455. In turn, the activity workflow state of approved 450 is changed to an activity workflow state of delivered 460. The activity workflow action of deliver 455 may indicate, for example, the activity workflow entity being released for incorporation into a configuration record. At the activity workflow state of delivered 460, the activity workflow entity is in a condition of being delivered from the developer's workspace into a development team's workspace.

The activity workflow state of delivered 460 may be changed, for example, by an activity workflow action of close 465. The activity workflow state of delivered 460 is then changed to an activity workflow state of closed 470. The activity workflow action of close 465 may indicate, for example, no further work is to be performed on the activity workflow entity. At the activity workflow state of closed 470, the activity workflow entity is in a condition of requiring no further attention.

Exemplary Workflow—Change Request Workflow

Figure 5:
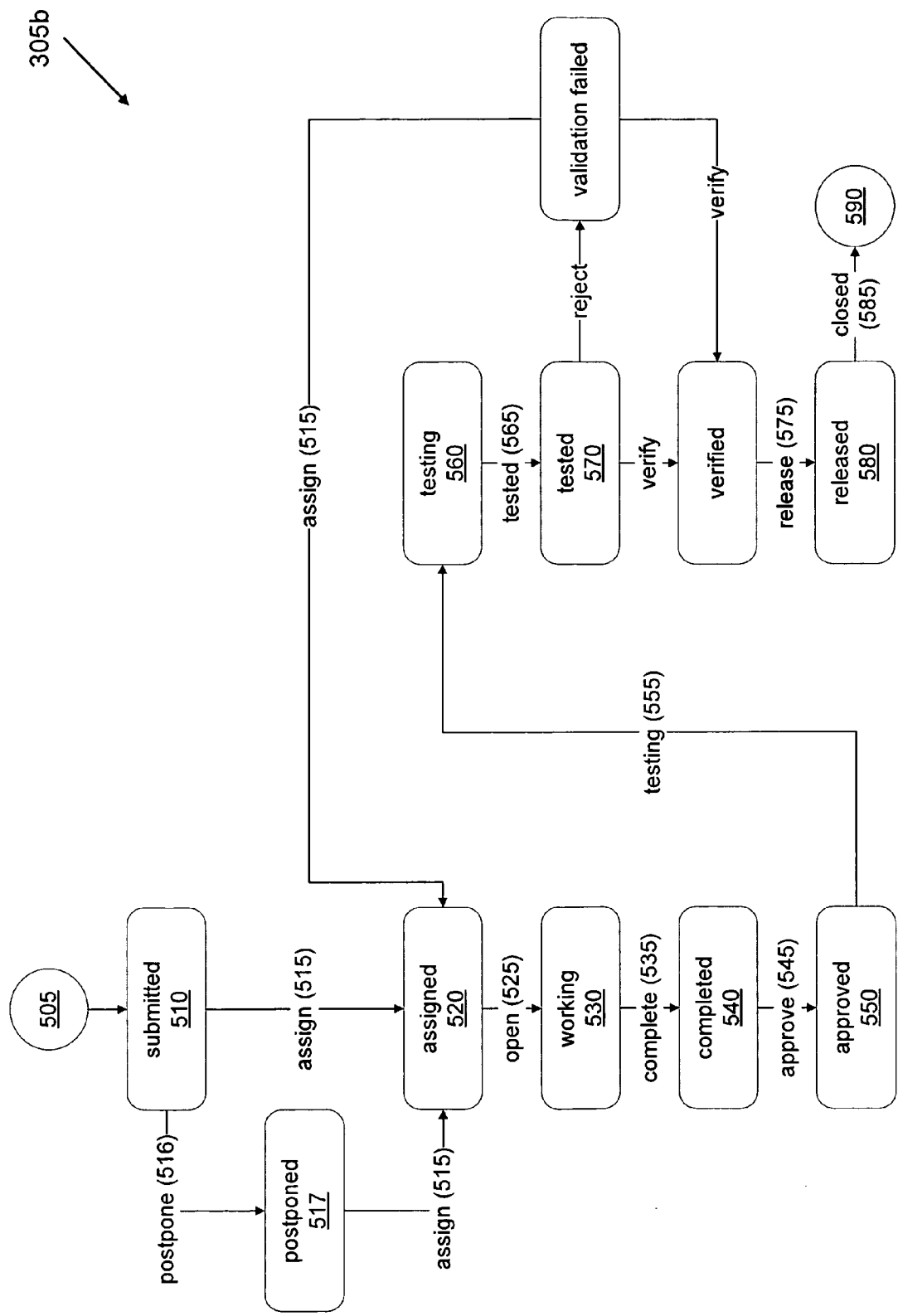
FIG. 5 is a flow diagram illustrating an exemplary change request workflow in accordance with one embodiment of the present invention.

Referring to FIG. 5, an exemplary change request workflow 305b details a transitioning of a change request entity. The transitioning of the change request workflow entity through the exemplary change request workflow 305b may be described by the following exemplary workflow states and workflow actions.

The change request workflow 305b is started by a change request workflow action of submit 505. The change request workflow action of submit 505 requires a form to be filled in with appropriate details regarding the change request workflow entity. Additionally, a state of the change request workflow 305b is changed by the change request workflow action of submit 505.

For example, the state of change request workflow 305b is changed by the change request workflow action of submit 505 to a change request workflow state of submitted 510. At the change request workflow state of submitted 510, the change request workflow entity may be, for example, in a condition of being placed in a lead developer's review queue. Furthermore, at the change request workflow state of submitted 510, the change request workflow entity may be, for example, in a condition of being unassigned.

The change request workflow state of submitted 510 is changed by a change request workflow action of assign 515. The change request workflow state of submitted 510 is accordingly changed to a change request workflow state of assigned 520. The change request workflow action of assign 515 indicates that the change request workflow entity needs to be reviewed and scheduled for implementation. At the change request workflow state of assigned 520, the change request workflow entity is in a condition of being determined "in scope" and slated for resolution before an upcoming target milestone.

Furthermore, at the change request workflow state of assigned 520, the change request workflow entity is created into and assigned as one or more other workflow entities. As previously described, a workflow entity may represent an unit of work to be performed or a plurality of smaller units of work to be performed. Consequently, creating and assigning the change request workflow entity into one or more other workflow entities at the change request workflow state of assigned 520 may represent dividing an unit of work to be performed into a plurality of smaller units of work to be performed. In the case where the unit of work to be performed is divided, the change request workflow entity representing the unit of work to be performed is referred to as a parent workflow entity while one or more other workflow entities representing the plurality of smaller units of work to be performed are referred to as child workflow entities.

Alternatively, the change request workflow state of submitted 510 may be changed by a change request workflow action of postpone 516. In turn, the change request workflow state of submitted 510 is changed to a change request workflow state of postponed 517. The change request workflow action of postpone 516 indicates that the change request workflow entity is removed from active analysis and/or resolution. At the change request workflow state of postponed 517, the change request workflow entity is in a condition of having value, but no work will be assigned in the near future. Additionally, the change request workflow state of postponed 517 may be, for example, in a condition of being periodically reviewed by the lead developer.

Similar to the aforementioned, the change request workflow action of assign 515, may also change the change request workflow state of postponed 517 to the change request workflow state of assigned 520.

The change request workflow state of assigned 520 may be changed by a change request workflow action of open 525. The change request workflow state 520 of assigned is then changed to a change request workflow state of working 530. The change request workflow action of open 525 may indicate that the change request entity is waiting for work associated with the change request entity to be completed. In the case where the change request entity is the parent workflow entity, the change request workflow action of open 525 may indicate that the change request entity is waiting for work associated with the child workflow entities to be completed.

The change request workflow state of working 530 is changed by a change request workflow action of complete 535. The change request workflow state of working 530 in turn is changed to a change request workflow state of completed 540. The change request workflow action of complete 535 indicates that work relating to the change request entity is completed and approved by the lead developer. In the case where the change request entity is the parent workflow entity, the change request workflow action of complete 535 may indicate that work relating to the child workflow entities is completed and approved by the lead developer. Additionally, the change request workflow action of complete 535 may indicate that the work relating to the change request workflow entity is awaiting approval for integration into a planned release.

At the change request workflow state of completed 540, the change request workflow entity is in a condition of being completed. That is, the developer or developers have completed the work relating to the change request workflow entity.

The change request workflow state of completed 540 is changed by a change request workflow action of approve 545. In response, the change request workflow state of completed 540 is changed to an activity workflow state of approved 550. The change request workflow action of approve 545 indicates that the change request workflow entity is approved for incorporation in the planned release by the lead developer. Additionally, the change request workflow action of approve 545 indicates that an integration testing is beginning.

At the change request workflow state of approved 550, the change request workflow entity is in a condition of being approved for integration into the planned release by the lead developer. Additionally, at the change request workflow state of approved 550, the change request workflow entity may be in a condition of passing through a point of control (as previously described).

The change request workflow state of approved 550 is changed by a change request workflow action of testing 555. The change request workflow state of approved 550 is then changed to a change request workflow state of testing 560. The change request workflow action of testing 555 indicates a testing of the change request workflow entity in an integration environment. At the change request workflow state of testing 560, the change request workflow entity is in a condition of being tested in the integration environment.

The activity workflow state of testing 560 is changed by a change request workflow action of tested 565. The change request workflow state of testing 560 is then changed to a change request workflow state of tested 570. The change request workflow action of tested 565 indicates that the integration testing of the change request workflow entity is completed. Additionally, the change request workflow action of tested 565 indicates that the change request workflow entity is ready for a quality assurance testing. At the change request workflow state of tested 570, the change request workflow entity is in a condition of passing the integration testing. Additionally, at the change request state of tested 570, the change request workflow entity is in a condition of preparing the quality assurance testing.

The change request workflow state of tested 570 is changed by a change request workflow action of release 575. The change request workflow state of tested 570 is then changed to a change request workflow state of released 580. The change request workflow action of release 575 indicates that the change request workflow entity is incorporated into a configuration record. At the change request workflow state of released 580, the change request workflow entity is in a condition of having completed testing.

The change request workflow state of released 580 is changed by a change request workflow action of close 585. In turn, the change request state of released 580 is changed to closed 590. The change request workflow action of close 585 indicates that no further work is to be performed on the change request workflow entity. At the change request workflow state of closed 590, the change request workflow entity is in condition of requiring no further attention.

Exemplary Workflow—Release Package Workflow

Figure 6:
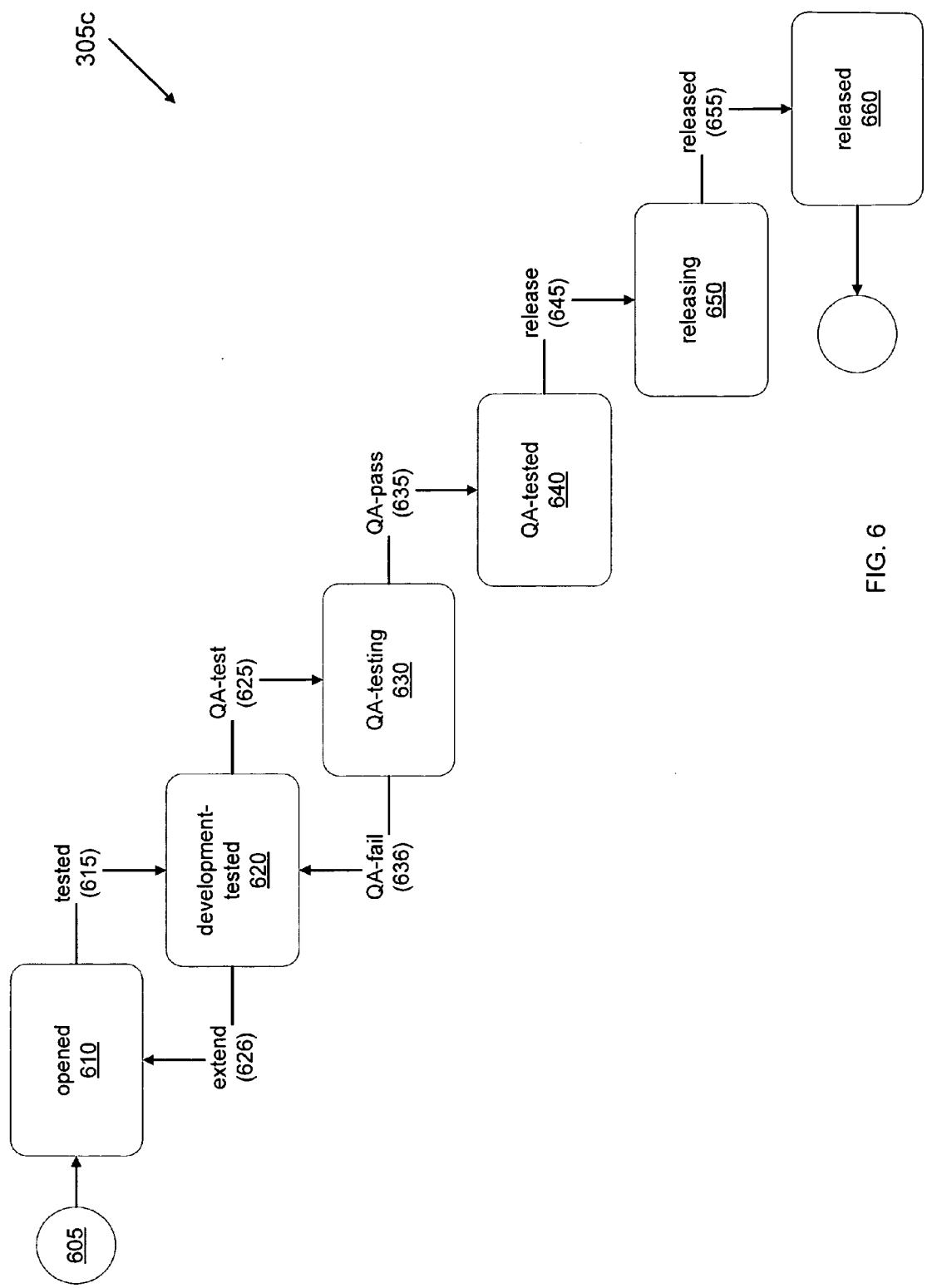
FIG. 6 is a flow diagram illustrating an exemplary release package workflow in accordance with one embodiment of the present invention.

Referring to FIG. 6, an exemplary release package workflow 305c details a transitioning of a release package entity. The transitioning of the release package workflow entity through the exemplary release package workflow 305c may be described by the following exemplary workflow states and workflow actions.

The release package workflow 305c is started by a release package workflow action of submit 605. The release package workflow action of submit 605 requires a release package workflow entity to be created. Recall briefly, a workflow entity may represent a unit of work to be performed, a plurality of smaller units of work to be performed or a larger unit of work to be performed.

Additionally, the release package workflow action of submit 605 may also require a configuration record to be designated and assigned. Recall briefly, the configuration record may describe a configuration relating to one or more units of work to be performed. The configuration record may also include information enabling a managed deployment.

In addition to requiring the workflow entity be created and the configuration record be designated and assigned, the release package workflow action of submit 605 also changes a state of the release package workflow 305c.

For example, the state of the release package workflow 305c is changed by the release package action of submit 605 to a release package workflow state of opened 610. At the release package workflow state of opened 610, the release package workflow entity is in a condition of being placed in a lead developer's queue.

The release package workflow state of opened 610 is changed by a release package workflow action of tested 615. The release package workflow state of opened 610 is then changed to a release package workflow state of development-tested 620. The release package workflow action of tested 615 indicates that the configuration record successfully passed integration testing. At the release package workflow state of development-tested 620, the configuration record is in a condition of passing through a point of control (previously described). For example, the workflow entity may be in a condition of having passed a development level integration testing and being promoted to tested. Furthermore, at the release package workflow state of development-tested 620, a test result resulting from the development level integration test may be attached, for example, to a workflow entity record.

The release package workflow state of development-tested 620 is changed by a release package workflow action of QA-test 625. In turn, the release package workflow state of development-tested 620 is then changed to a release package workflow state of QA-testing 630. The release package workflow action of QA-test 625 indicates that the configuration record is in Quality Assurance (QA). At the release package workflow state of QA-testing 630, the configuration record is in a condition of passing through another point of control (previously described). For example, the configuration record may be in a condition of being validated in a QA environment.

Alternatively, the release package workflow state of development-tested 620 is changed by a release package workflow action of extend 626. The release package workflow state of development-tested 620 is then changed to the release package workflow state of opened 610. The release package workflow action of extend 626 indicates that the release package workflow entity is returned to the release package workflow state of opened 610 to be reconfigured. As previously described, at the release package workflow state of opened 610, the release package workflow entity is in the condition of being placed in the lead developer's queue.

The release package workflow state of QA-testing 630 is changed by a release package workflow action of QA-pass 635. In turn, the activity workflow state of QA-testing 630 is changed to an activity workflow state of QA-tested 640. The release package workflow action of QA-pass 635 indicates that the configuration record has successfully passed QA. At the release package workflow state of QA-tested 640, the configuration record is in a condition of having passed QA level testing. Furthermore, at the release package workflow state of QA-tested 640, a test result resulting from the QA level integration test may be attached to the workflow entity record.

Alternatively, the release package workflow state of QA testing 630 is changed, by a release package workflow action of QA-fail 636. The release package workflow state of QA-testing 630 is then changed to the release package workflow state of development-tested 620. The release package workflow action of QA-fail 636 indicates that the release package workflow entity is rejected. As previously described, at the release package workflow state of development-tested 620, the configuration record is in the condition of having passed the development level integration testing and being promoted to tested. Furthermore, at the release package workflow state of development-tested 620, the test result resulting from the development level integration test may be attached to the workflow entity record.

The release package workflow state of QA-tested 640 is changed by a release package workflow action of release 645. The release package workflow state of QA-tested 640 is changed to a release package workflow state of releasing 650. The release package workflow action of release 645 indicates that the configuration record is scheduled for release to a production environment. At the release package workflow state of releasing 650, the configuration record is in a condition of passing through yet another point of control (previously described). For example, the configuration record may be in a condition of being scheduled for deployment to production.

The release package workflow state of releasing 650 is changed by release package workflow action of released 655. In response, the release package workflow state of releasing 650 is changed to a release package workflow state of released 660. The release package workflow action of released 655 indicates that the configuration record is in the production environment. At the release package workflow state of released 660, the configuration record is in a condition of being verified.

Managed Deployment

Figure 7:
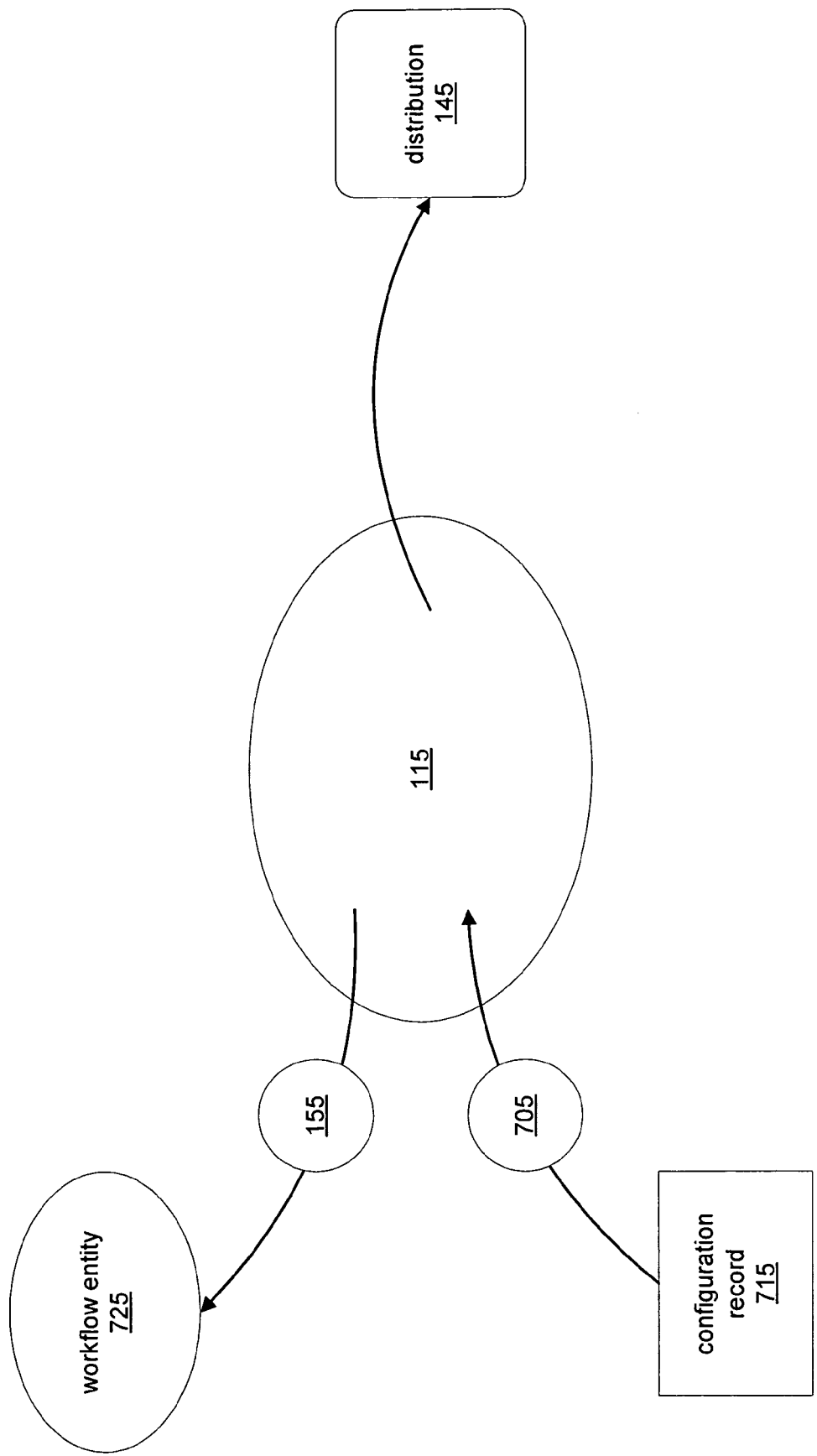
FIG. 7 is a block diagram illustrating an exemplary managed deployment engine in accordance with one embodiment of the present invention.

Referring to FIG. 7, a managed deployment engine 115 uses a distribution definition 705 to manage deployment of a distribution 145 to a deployment environment. The distribution definition 705 provides a logic and specifications on how to package a development asset and how the development asset will manifest itself in the target environment. For example, the distribution definition 705 may provide information binding a location of the development asset to a target location in the deployment environment.

Additionally, the managed deployment engine 115 in managing deployment of the distribution 145 uses a configuration record 715. The configuration record 715 includes an attribute enabling managed deployment. For example, the configuration record 715 includes a build administrator attribute identifying who may build the distribution 145. In another example, a release administrator attribute may be included identifying who may release the distribution 145. In yet another example, a deployment environment attribute may be included identifying what deployment environment to deploy the distribution 145. In still yet another example, an asset path attribute may be included identifying the previously described distribution definition 705. In even still another example, a configurable workflow attribute may be included, identifying, for example, an identification of a workflow entity and a record type.

One skilled in the art will readily appreciate that the configuration record 715 includes one or more of the aforementioned attributes. Furthermore, one skilled in the art will readily appreciate that the attributes included in the configuration record 715 are in no way limited to the aforementioned attributes, but may include other attributes known in the art.

Additionally, the managed deployment engine 115 in managing deployment of the distribution 145 uses a deployment log 155 to log a result of deployment. For example, the deployment log 155 logs what distribution 145 was deployed. The deployment log 155 may also log who deployed the distribution 145, where was the distribution 145 deployed, and which configuration of the distribution 145 was deployed. It should be readily apparent to those skill in art that the inventiveness of the claimed invention lies in logging the result of deployment and not what result is logged. Accordingly, one skill in the art will readily appreciate that the claimed invention is applicable to any combination of the aforementioned results of deployment known in the art. The deployment log 155 may be attached to a workflow entity 725.

Figure 8:
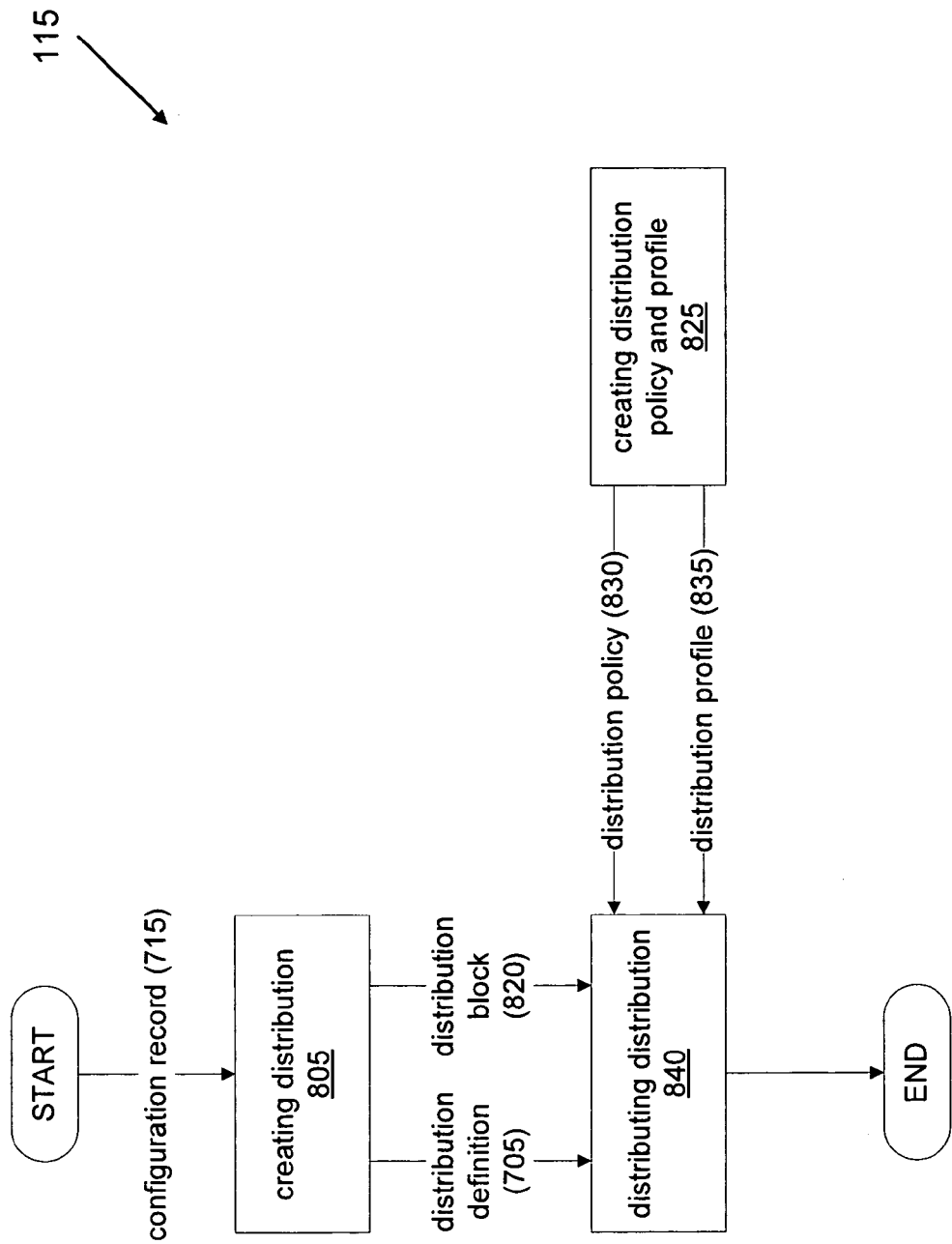
FIG. 8 is a block diagram illustrating an exemplary managed deployment in accordance with one embodiment of the present invention.

Referring to FIG. 8, a managed deployment engine 115, in one embodiment manages deployment of a distribution 145 as follows. At a step 805, a configuration record 715 is used to create a distribution definition 705 and a distribution block 820. The configuration record 715 describes a configuration relating to one or more units of work performed. For example, the configuration record 715 describes one or more development assets resulting from development work. The development asset(s) described by the configuration record 715 may be, but is not limited to, a binary, a source code, a document, or a web page. The created distribution definition 705 contains a logic and specifications on how to package and manifest the development assets. For example, the distribution definition 705 may bind the location of development assets stored on a source host to a location on a target host. In another example, the distribution definition 705 provides a sequential list of actions to be executed on the target host.

The created distribution block 820 bundles all resources necessary to execute the sequential list of actions. For example, the distribution block 820 packages development assets such as, but not limited to, *.class, *jar, *.war, and *.ear files. In another example, the distribution block 820 bundles development assets such as, but not limited to, source code, documentation, and web pages. It should be readily apparent to those skilled in the art the present invention is not limited to the aforementioned development assets, but includes other development assets known in the art.

Additionally, in packaging development assets, the distribution block 820 may be closed or opened. In the case of the distribution block 820 being closed, the deployment asset(s) are copied from the source host to a distribution repository. Consequently, changes in development asset(s) do require recreating the distribution block 820. In the case where the distribution block 820 is opened, the deployment asset(s) are referenced by pointers. That is, rather than distributing copies of the development asset(s) at 840, the address(es) of the development asset(s) are distributed instead. In this way, changes in development asset(s) do not require recreating the distribution block 820.

At a step 825, a distribution policy 830 is created. The distribution policy 830 governs distributing the distribution block 820 at a step 840. For example, the distribution policy 830 dictates distributing distribution block 820 to only a test server or a restricted server. In another example, the distribution policy 830 dictates when distributing occurs. In yet another example, the distribution policy 830 dictates who has access to the distribution policy 830.

Additionally, the distribution policy 830 may be associated with one or more target hosts to form an association. Accordingly, each target host of the association shares at least one distribution policy 830. In the case of the distribution policy 830 governs distributing the distribution block 820, the distribution block 820 is distributed to each target host of the association. The distribution block 820, however, is not distributed to a target host which is not of the association, i.e., a target host, which does not share at least one distribution policy 830.

Additionally, at the step 825, a distribution profile 835 is also created. The distribution profile 835 identifies the distribution block 820 to be distributed. In the case of the distribution block 820 being governed by the distribution policy 830 and identified by the distribution profile 835, the distribution policy 830 is associated with one or more distribution profiles 835. To further illustrate the managed deployment of the distribution, consider the following exemplary managed deployment scenario.

Figure 9:
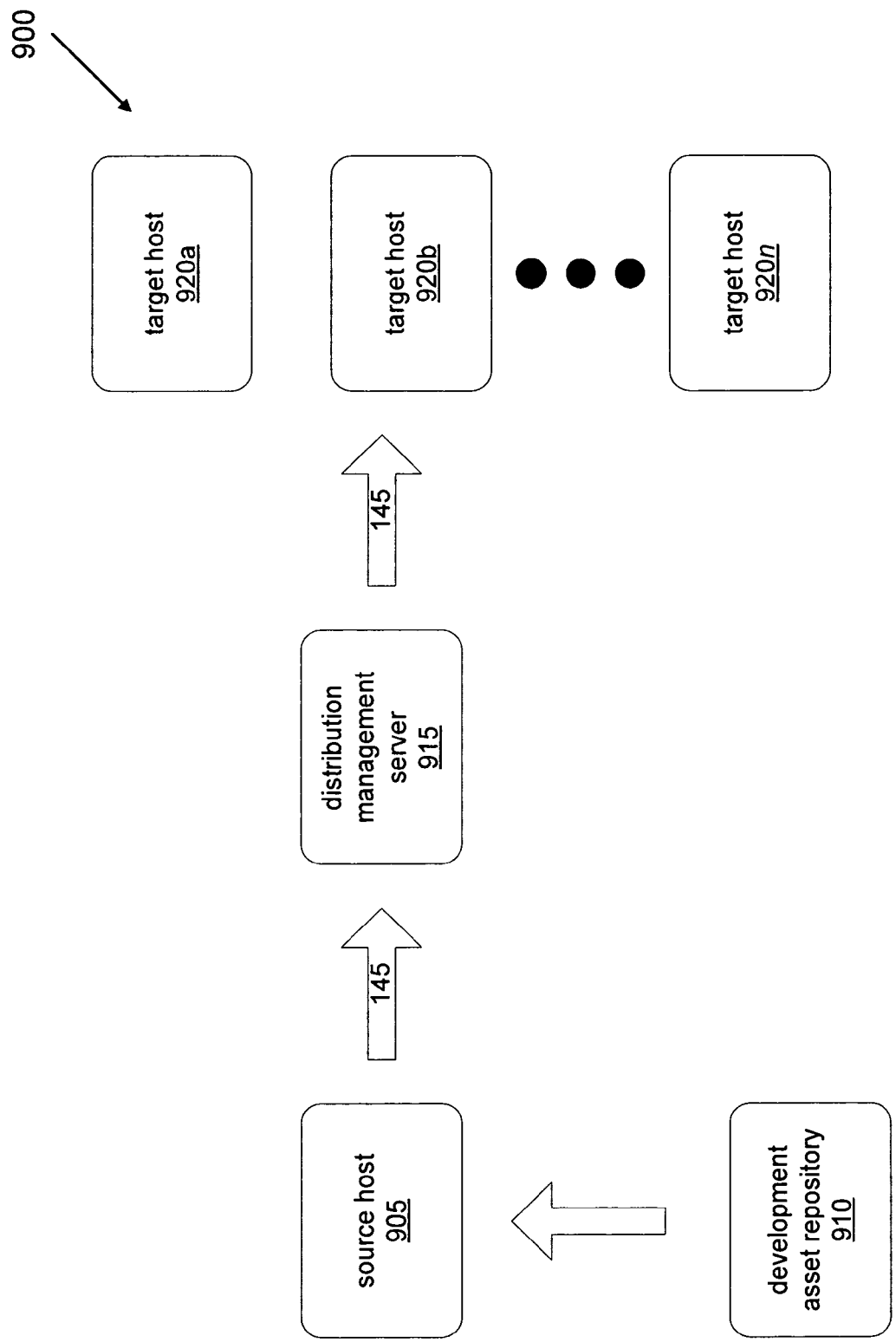
FIG. 9 is a block diagram illustrating an exemplary managed distribution scenario in accordance with one embodiment of the present invention.

Referring to FIG. 9, an exemplary managed deployment scenario 900 includes a source host 905, a development asset repository 910, a distribution management server 915, and one or more target hosts 920*a*, 920*b* . . . 920*n* (generally 920). Additionally, the exemplary managed deployment scenario 900 involves a build specialist, a release manager, and a deployment specialist.

The build specialist completes a build of a development asset in accordance with the previously described configurable workflow engine 105 (see FIG. 3, see also FIGS. 4-6). The built development asset is subsequently deposited in the development asset repository 910. The deposited development asset may be, for example, source files (e.g., c, c++, or java), binaries ( e.g., *.war, *ear, *.jar, *.class or *.o) or any other object as is known in the art.

Based on the build of the development asset, the build specialist proceeds to create a configuration record describing the configuration of the development asset. The build specialist sets a promotion level for the configuration record. Once an appropriate build promotion level is attained, the configuration record is a candidate for deployment to the target hosts 920.

With the configuration record promoted by the build specialist, the release manager may then replace a prior configuration record with the recently promoted configuration record. If the release manager is satisfied that the configuration record is truly a candidate for deployment, an appropriate release promotion level is set.

Additionally, the release manager at the source host 905 may create from the development asset a distribution 145 for deployment. The created distribution 145 includes a distribution definition file (described in greater detail below), a distribution file (described in greater detail below), a distribution block file (described in greater detail below), or any combination thereof.

The distribution definition file includes a text version of the distribution. The distribution definition file may contain a definition, e.g., a sequential list of actions to be executed on the one or more target hosts 920. The definition includes a sequence of stanzas, each of which describes an action to be executed. In one embodiment, the distribution definition file is editable using a text editor.

The distribution file is the distribution definition file compressed. Similar, to the distribution definition file, the distribution file holds only a definition of the actions to be perform on the one or more target hosts 920. In contrast to the distribution definition file, the distribution file is compressed. As such, the distribution file is in a not-built format indicating that the actual resources from the source host do not reside on the source host 905.

The distribution block file is all resources necessary to execute actions contain in the distribution. At distribution time, the resources do not need to be collected from the source host 905 as the resources are already contained in the distribution block file. When the distribution is distributed to the one or more target hosts 920, the distribution block file itself is not stored on each of the target hosts 920. Rather the resources are unpacked into each of the target hosts. In this way there is no need for additional disk space on each of the target hosts 920 for the distribution block file. In contrast to the distribution file, which contains the compressed list of actions to be executed, the distribution block file holds all the resources. As such, the distribution block file is in a built format.

Continuing with FIG. 9 with the distribution 145 created (e.g., the distribution definition file, the distribution file, the distribution block file, or the combination thereof), the deployment specialist may then source the distribution 145 and deploy the distribution 145 using the distribution management server 915 to distribute the distribution 145 to the target hosts (920*a*, 920*b* . . . 920*n*). The distribution management server 915 in distributing the distribution 145 has one or more different user interfaces. For example, a GUI (described in further detail below) or a command line. The distribution 145 is distributed, for example, to only target hosts (e.g., 920) which are within a distribution policy region.

Exemplary User Interface

In distributing the distribution 145, an exemplary user interface provides associating a distribution policy 830 with one or more target hosts 920 to create an association. Having created the association, the graphical user interface provides importing the distribution 145 from a source host to create a distribution profile 835. Having created the distribution profile 835, the graphical user interface provides dragging and dropping the distribution profile 835 onto the one or more host targets 920 of the created association. Having dragged and dropped the distribution profile 835, the distribution 145 is then distributed to the one or more host targets 920.

Interconnecting—Providing Audibility and Bidirectional Traceability

Figure 10:
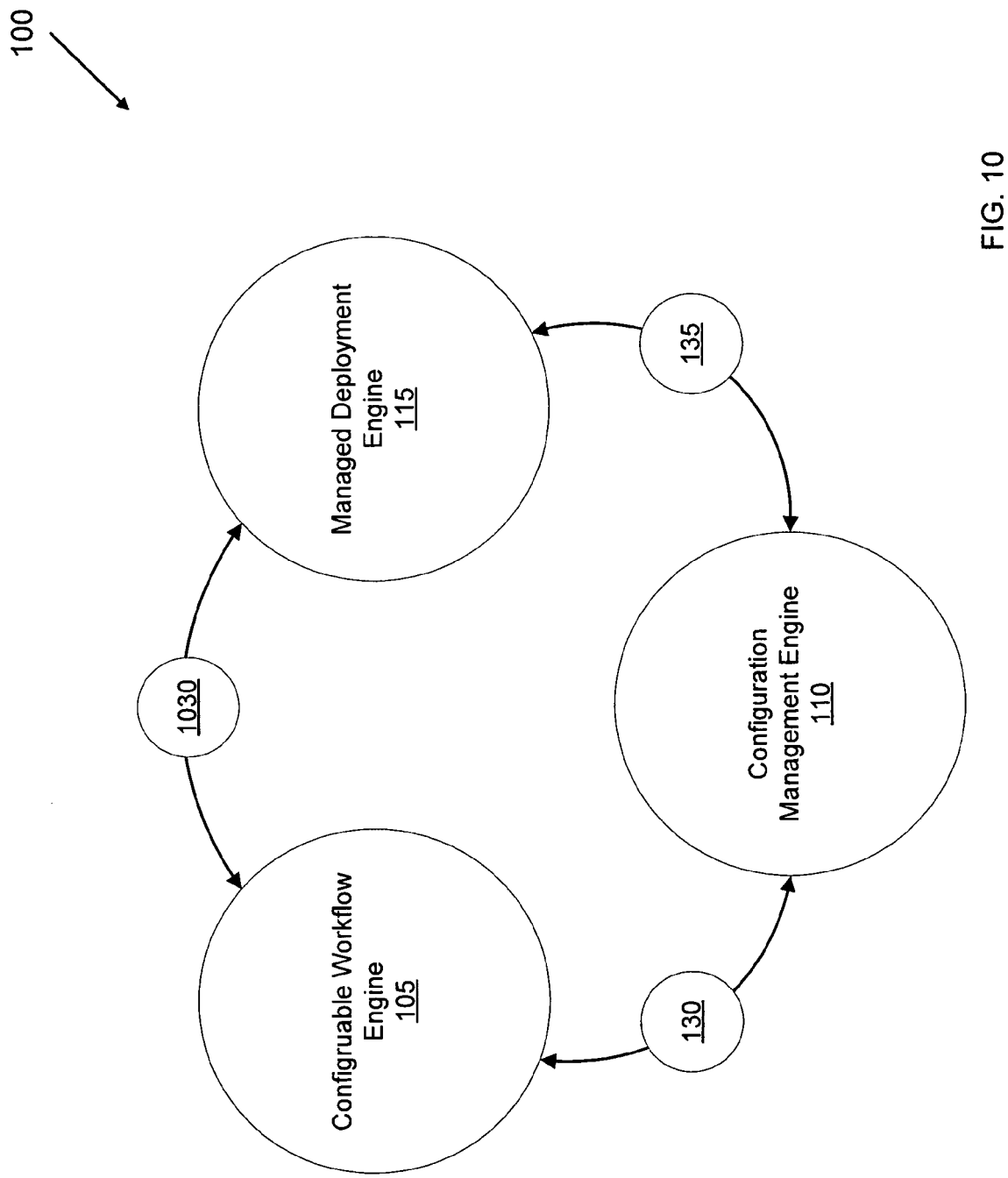
FIG. 10 is a block diagram illustrating interconnecting with one or more representations of work performed or of work performed in an integrating development/deployment solution in accordance with one embodiment of the present invention.

Referring to FIG. 10 the integrated development/deployment solution 100 of the present invention includes a configurable workflow engine 105, a configuration management engine 110, and a managed deployment engine 115, as described above. Interconnecting the configurable workflow engine 105 and the configuration management engine 110 is a list of versioned development assets 130. The list of versioned development assets 130 represents work to be performed or work performed corresponding to a request for change, such as a defect or an enhancement.

Interconnecting the configurable workflow engine 105 and the managed deployment engine 115 is a workflow entity 1030. The workflow entity 1030 represents work to be performed or work performed by one or more developers. Interconnecting the configuration management engine 110 and the managed deployment engine 115 is a configuration record 135. The configuration record 135 includes one or more lists of versioned development assets 130. Consequently, the configuration record 135 represents one or more work to be performed, or one or more work performed.

Interconnecting the aforementioned engines with one or more representations of work to be performed or of work performed, as previously described, enables the integrated development/deployment solution 100 to provide, for example, an audit trail between a development asset in a development phase of a software development lifecycle (previously described) and a distribution in a deployments phase of the software development lifecycle (previously described). For example, using the configuration record 135, what and where the development asset was distributed may be determined from the distributed distribution in the deployment phase.

Additionally, the integrated development/deployment solution 100 is capable of providing, for example, bidirectional traceability from the development asset in the development phase to the distribution in the deployment phase, and vice versa. For example, using the configuration record 135, a discovered defect in the distribution found in the deployment phase may be traced to a defect in the development asset. Conversely, using a workflow entity 1030, for example, a discovered defect in the development asset found in the development phase maybe be traced to the distribution, even though the defect remains undiscovered in the distribution in the deployment phase. Accordingly, by interconnecting the configurable workflow engine 105, the configuration management engine 110, and the managed deployment engine 115 with one or more representations of work to be performed or of work performed, such as, the list of versioned development assets 130, the workflow entity 1030, and the configuration record 135, the integrated development/deployment solution 100 provides both auditability and bidirectional traceability.

Figure 2A:
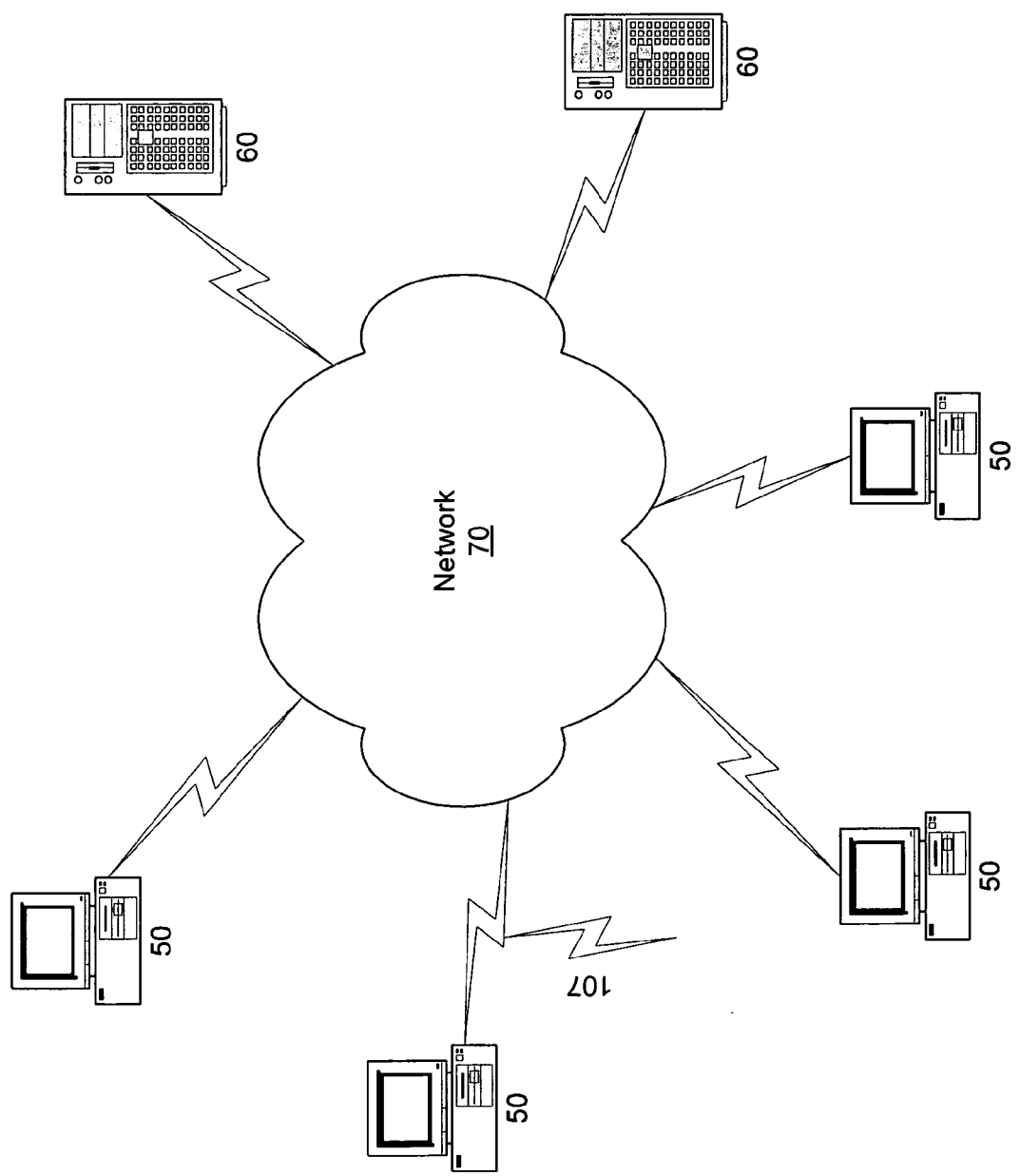
FIGS. 2a and 2b are schematic views of a computer network and a computer node within the computer network supporting one embodiment of the present invention.
Figure 2B:
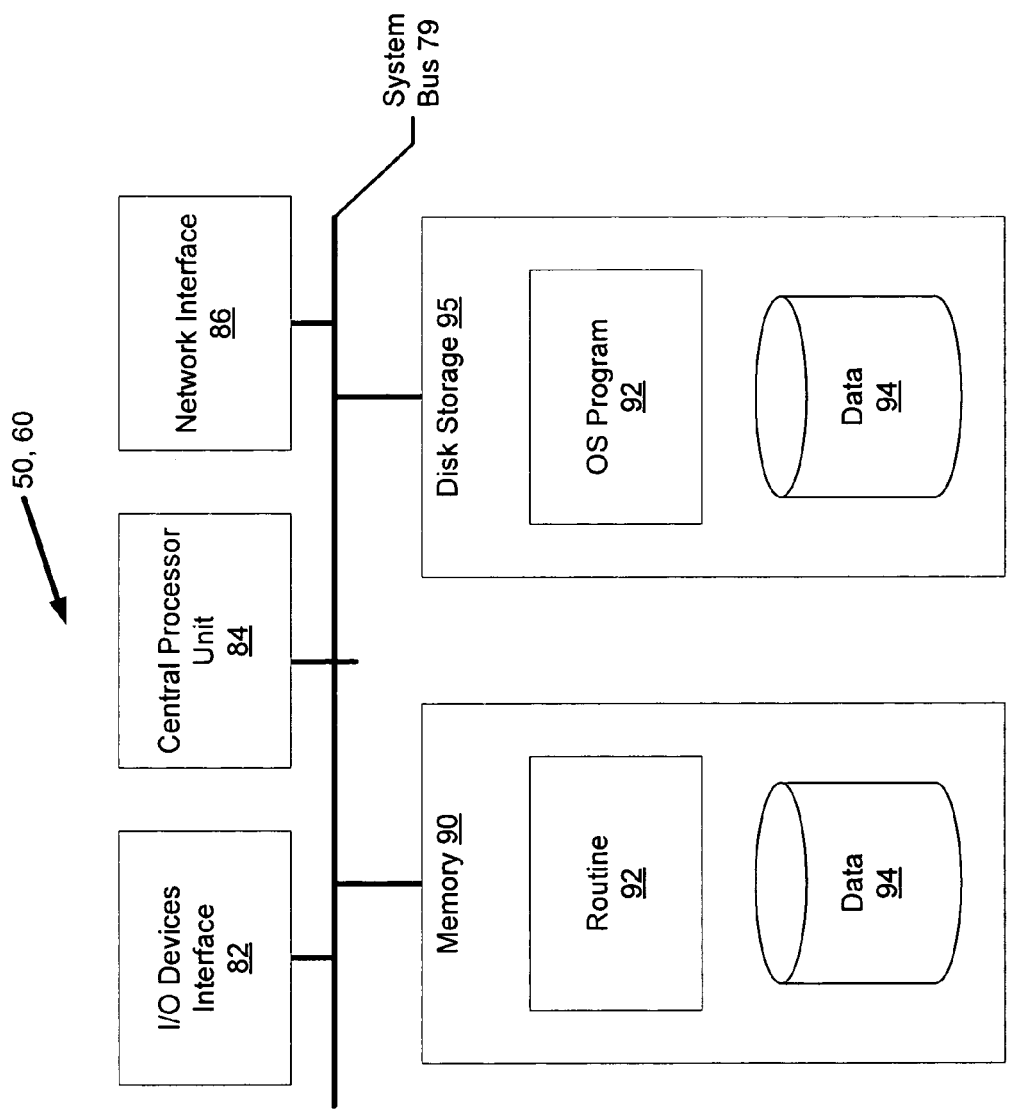

Turning now to FIGS. 2*a* and 2*b*. FIGS. 2*a* and 2*b* are an overview and a schematic view of a computer network environment is which embodiments of the present invention are employed.

FIG. 2*a* illustrates a computer network or similar digital processing environment in which embodiments of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 2b is a diagram of the internal structure of a computer (e.g., client processor/device 50 or server computers 60) in the computer system of FIG. 2a. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 2a). Memory 90 provides volatile storage for computer software instructions 92 and data 94 used to implement an embodiment of the present invention (e.g., integrated software development/deployment solution 100, as detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or other connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While the present invention has been particularly shown and described with references to preferred embodiments thereof, it will be understood by those skilled in the art that various changes in form and details may be made therein without departing from the scope of the invention encompassed by the appended claims.

For example, the present invention may be implemented in a variety of computer architectures. The computer network of FIGS. 2a and 2b are for purposes of illustration and not limitation of the present invention.

Additionally, the present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk - read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A computer implemented method for providing a software development lifecycle with auditability and bidirectional traceability, the software development lifecycle having at least a development phase and a deployment phase, the method comprising:

bridging the development phase of the software development lifecycle and the deployment phase of the software development lifecycle with a configurable workflow engine, a configuration management engine, and a managed deployment engine; and interconnecting the configurable workflow engine, the configuration management engine, and the managed deployment engine with one or more representations of work to be performed or of work performed, wherein the one or more representations of work to be performed or of work performed provide the software development lifecycle with auditability and bidirectional traceability;

(i) wherein the configuration management engine further provides:

responding to a request for change from the configurable workflow engine; providing one or more lists of versioned development assets needed to work on the request for change to the configurable workflow engine;

providing a configuration record representing the one or more lists of versioned development assets to the managed deployment engine; and wherein the one or more representations of work to be performed or of work performed includes the request for change, and the one or more lists of versioned development assets;

(ii) wherein the configurable workflow management engine further provides:

responding to a request for change;

initiating one or more workflows in response to the request for change, each workflow having a workflow entity, one or more workflow states, and one or more workflow actions;

transitioning the workflow entity through the one or more workflow states in accordance with the one or more workflow actions;

representing the workflow entity as one or more lists of versioned development assets for the configuration management engine to manage;

providing the workflow entity to the managed deployment engine to be deployed; and wherein the one or more representations of work to be performed or of work performed includes the request for change, and the workflow entity;

(iii) wherein the managed deployment workflow engine further provides:

responding to a transitioning of a workflow entity in a workflow of the configurable workflow engine;

creating a distribution using a configuration record from the configuration management engine, the configuration record corresponds to the transitioned workflow entity;

distributing the distribution to one or more host targets;

attaching a distribution log logging the distributing of the distribution to the one or more target hosts; and wherein the one or more representations of work to be performed or of work performed includes the workflow entity, and the configuration record.

2. The method of claim 1, wherein the distributing is governed by a distribution policy, the distribution policy dictating any combination of: who to distribute the distribution to, when to distribute the distribution, and who has access to the distribution policy.

3. The method of claim 2, wherein the distributing is limited to a collection of target hosts, each target host of the collection of target hosts share at least one distribution policy with the collection of target hosts.

4. The method of claim 1, wherein the interconnecting involves a configuration record, the configuration record further comprising;

one or more lists of versioned development assets representing work to be performed or of work performed; and any combination of: a target environment attribute identifying one or more target hosts to distribute a distribution to, a build administrator list attribute identifying who may build the distribution to be distributed, a release administrator list attribute identifying who may distribute the distribution, and a workflow entity identifier attribute identifying a workflow corresponding to the distribution.

5. The method of claim 4, wherein the configuration record and the distribution are accordingly labeled so as to provide auditability and bidirectional traceability.

6. A computer implemented method for providing auditability and bidirectional traceability of software in a software development lifecycle having at least a development phase and a deployment phase, the method comprising:

using a configuration record referring a development asset in the development phase to a deployment asset in the deployment phases so that any combination of:

i) the development asset developed in the development phase can be determined from the deployment asset deployed in the deployment phase, ii) a deploying entity deploying the deployment asset in the deployment phase can be determined from the development asset developed in the development phase, iii) a development request for developing the development asset in the development phase can be determined from the deployment asset deployed in the deployment phase, and iv) a deployment environment where the deployment asset is being deployed in the deployment phase can be determined from the development asset in the development phase; and as a function of the configuration record, providing auditability and bidirectional traceability of the software in the software development lifecycle.

7. The method of claim 6, wherein the configuration record comprising:

developing in the development phase the development request into the development asset through one or more development workflows;

creating the deployment asset from the development asset using a configuration record representing the developed development asset;

deploying in the deployment phase the deployment asset to the deployment environment using a deployment policy; and logging the deploying in the deployment phase using a deployment log accessible to the development phase.

8. The method of claim 7, wherein each development workflow has one or more development workflow states and one or more development workflow actions for developing the development request into the development asset, each development workflow state transitions into another development workflow state in accordance with the one or more development workflow actions, whereby each transition represents any combination of: assigning the development request or the development asset to one or more developers, working on the development asset by one or more developers, requiring the development asset in one workflow state meet a condition prior to transitioning to another workflow state, and deploying the development asset to one or more deployment environments.

9. The method of claim 7, wherein the configuration record describes a configuration of the development assets developed from the development request, and provides any combination of: a deployment environment attribute identifying the deployment environment to deploy the deployment asset to, a build administrator list attribute identifying who may build the deployment asset to be deployed, a release administrator list attribute identifying who may deploy the deployment asset, and a development workflow identifier attribute identifying a development workflow corresponding to the development of the development asset from the development request.

10. The method of claim 7, wherein the distribution policy dictates any combination of: who to distribute the deployment asset to, when to distribute the deployment asset, and who has access to the distribution policy.

11. The method of claim 7, wherein the development log logs any combination of: what deployment asset was deployed, who deployed the deployment asset, where was the deployment asset deployed, and what configuration of development asset corresponds to the development asset.

12. The method of claim 6, wherein the configuration record comprising:
bridging the development phase of the software development lifecycle and the deployment phase of the software development lifecycle with a configurable workflow engine, a configuration management engine, and a managed deployment engine, wherein the configurable workflow engine, the configuration management engine, and the managed deployment engine are interconnected with one or more representations of work to be performed or of work performed.

13. The method of claim 12, wherein the one or more representation of work to be perform or of work performed includes a configuration record, a list of versioned development assets, and a workflow entity.

14. An system for providing a software development lifecycle with auditability and bidirectional traceability, the software development lifecycle having at least a development phase and a deployment phase, the apparatus comprising:
means for bridging the development phase of the software development lifecycle and the deployment phase of the software development lifecycle with a configurable workflow engine, a configuration management engine, and a managed deployment engine; and
means for interconnecting the configurable workflow engine, the configuration management engine, and the managed deployment engine with one or more representations of work to be performed or of work performed, wherein the one or more representations of work to be performed or of work performed provide the software development lifecycle with auditability and bidirectional traceability;
(i) wherein the configuration management engine further provides:
means for responding to a request for change from the configurable workflow engine;
means for providing one or more lists of versioned development assets needed to work on the request for change to the configurable workflow engine;
means for providing a configuration record representing the one or more lists of versioned development assets to the managed deployment engine; and
wherein the one or more representations of work to be performed or of work performed includes the request for change, and the one or more lists of versioned development assets;
(ii) wherein the configurable workflow management engine further provides:
means for responding to a request for change;
means for initiating one or more workflows in response to the request for change, each workflow having a workflow entity, one or more workflow states, and one or more workflow actions;
means for transitioning the workflow entity through the one or more workflow states in accordance with the one or more workflow actions;
means for representing the workflow entity as one or more lists of versioned development assets for the configuration management engine to manage;
means for providing the workflow entity to the managed deployment engine to be deployed; and
wherein the one or more representations of work to be performed or of work performed includes the request for change, and the workflow entity; and
(iii) wherein the managed deployment workflow engine further provides:
means for responding to a transitioning of a workflow entity in a workflow of the configurable workflow engine;
means for creating a distribution using a configuration record from the configuration management engine, the configuration record corresponds to the transitioned workflow entity;
means for distributing the distribution to one or more host targets;
means for attaching a distribution log logging the distributing of the distribution to the one or more target hosts; and
wherein the one or more representations of work to be performed or of work performed includes the workflow entity, and the configuration record.

15. The system of claim 14, wherein the means for distributing is governed by a distribution policy, the distribution policy dictating any combination of: who to distribute the distribution to, when to distribute the distribution, and who has access to the distribution policy.

16. The system of claim 15, wherein the means for distributing is limited to a collection of target hosts, each target host of the collection of target hosts share at least one distribution policy with the collection of target hosts.

17. The system of claim 14, wherein the means for interconnecting involves a configuration record, the configuration record further comprising;
one or more lists of versioned development assets representing work to be performed or of work performed; and
any combination of: a target environment attribute identifying one or more target hosts to distribute a distribution to, a build administrator list attribute identifying who may build the distribution to be distributed, a release administrator list attribute identifying who may distribute the distribution, and a workflow entity identifier attribute identifying a workflow corresponding to the distribution.

18. The system of claim 17, wherein the configuration record and the distribution are accordingly labeled so as to provide auditability and bidirectional traceability.

19. A computer program product stored in a computer storage medium comprising: computer usable program code for providing auditability and bidirectional traceability of software in a software development lifecycle having at least a development phase and a deployment phase, the computer program product including; computer usable program code for bidirectional linking a development asset in the development phase to a deployment asset in the deployment phases so that any combination of:

i) the development asset developed in the development phase can be determined from the deployment asset deployed in the deployment phase;
ii) a deploying entity deploying the deployment asset in the deployment phase can be determined from the development asset developed in the development phase,
iii) a development request for developing the development asset in the development phase can be determined from the deployment asset deployed in the deployment phase, and
iv) a deployment environment where the deployment asset is being deployed in the deployment phase can be determined from the development asset in the development phase; and as a function of the linking, providing auditability and bidirectional traceability of the software in the software development lifecycle.

* * * * *